US012081355B1

(12) United States Patent
Soroker et al.

(10) Patent No.: US 12,081,355 B1
(45) Date of Patent: *Sep. 3, 2024

(54) MANAGEMENT OF COMMUNICATION BRIDGES BETWEEN DISPARATE CHAT ROOMS

(71) Applicant: 8x8, Inc., Campbell, CA (US)

(72) Inventors: Andrei Soroker, Campbell, CA (US); Peter Hizalev, Campbell, CA (US); Bryan R. Martin, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,213

(22) Filed: Jul. 25, 2022

Related U.S. Application Data (63) Continuation of application No. 16/878,002, filed on May 19, 2020, now Pat. No. 11,405,228, which is a continuation of application No. 15/810,452, filed on Nov. 13, 2017, now Pat. No. 10,659,243.

(60) Provisional application No. 62/555,812, filed on Sep. 8, 2017.

(51) Int. Cl.
| | | |
|---|---|---|
| *H04L 12/18* | (2006.01) | |
| *H04L 51/56* | (2022.01) | |
| *H04L 61/50* | (2022.01) | |
| *H04L 69/08* | (2022.01) | |
| *H04L 101/604* | (2022.01) | |

(52) U.S. Cl.
CPC ...... *H04L 12/1831* (2013.01); *H04L 12/1827* (2013.01); *H04L 51/56* (2022.05); *H04L 69/08* (2013.01); *H04L 61/50* (2022.05); *H04L 2101/604* (2022.05)

(58) Field of Classification Search
CPC . H04L 12/1831; H04L 12/1827; H04L 51/56; H04L 69/08; H04L 61/50; H04L 2101/604
USPC ............................................ 709/204; 715/753
See application file for complete search history.

(56) References Cited

U.S. PATENT DOCUMENTS

| | | | |
|---|---|---|---|
| 2010/0205540 A1* | 8/2010 | Gupta .................. | H04N 7/157 715/753 |
| 2014/0115502 A1* | 4/2014 | Van Wie ................ | H04W 4/21 715/757 |
| 2016/0149839 A1 | 5/2016 | Yi et al. | |

OTHER PUBLICATIONS

USPTO. Office Action dated Nov. 9, 2023, received for copending U.S. Appl. No. 17/863,101 of the common Applicant/Assignee (8x8, Inc.), 99 pages. Applicant has listed, the patent references cited in this non-final Office Action, in connection with 102 and/or 103 rejections (see pp. 77-97).

* cited by examiner

*Primary Examiner* — Emmanuel L Moise
*Assistant Examiner* — Mariegeorges A Henry
(74) *Attorney, Agent, or Firm* — Crawford Maunu PLLC (57) ABSTRACT

Certain aspects of the disclosure are directed to communication bridging in a telecommunication system. According to a specific example, a data-communications service provider uses a data-communication server and a uniform resource locator (URL) generation circuit to form a communication bridge between a different disparate chat rooms. The URL generation circuit generates a URL associated with the communication bridge. Using the generated URL an assimilation and processing circuitry, chat messages may be received and conveys by using the server and respective communication protocols associated with the chat rooms, between participants of the chat rooms.

20 Claims, 5 Drawing Sheets

MANAGEMENT OF COMMUNICATION BRIDGES BETWEEN DISPARATE CHAT ROOMS

OVERVIEW

Computer servers are increasingly being used to provide various services over a network including, but not limited to, VoIP communication services such as Voice over Internet Protocol (VoIP) calls, video conferencing, call exchange servers, packet switching, and traffic management as well as non-VoIP services including, but not limited to: chat messaging, website hosting, remote data storage, remote computing services, virtual computing environments, and social media hosting and/or integration.

The use of VoIP telecommunication services has been widespread and significant in terms of both numbers of users and types of services being made available. This growth may be attributable to any of a wide variety of socio-economic changes such as the mobility of users of these services, the types and reduced costs of portable telecommunication tools, and the ever-evolving technology adapting to the personal and business needs of the telecommunication users. Similarly, many communication platforms (e.g., social media technologies) have been developed, and these communication platforms take many different forms including blogs, business networks, enterprise social networks, forums, microblogs, photo sharing, products/services review, social bookmarking, social gaming, social networks, video sharing, and virtual worlds.

For business entities, the increased use of VoIP telecommunication services has been particularly complex, especially with regard to integrating the various VoIP telecommunication services and communication platforms available to end users. As examples, a VoIP telecommunication service provider, such as 8×8, Inc., can provide such VoIP services to a multitude of business entities each having customized VoIP systems configured to provide telecommunication services to a wide range of employees.

SUMMARY

Various example embodiments are directed to issues such as those addressed above and/or others which may become apparent from the following disclosure concerning systems and methods for communication bridging among disparate chat rooms.

Embodiments are directed toward methods for use in telecommunication systems employing a VoIP server operated by a telecommunication provider, where the VoIP server on the VoIP provider side (e.g., VoIP provider server as commercially available services from 8×8, Inc.), is used to provide VoIP services to a multitude of client entities. Example embodiments describe establishing reliable, bi-directional collaborative environments between disparate chat rooms (such as on independent communications platforms). Examples of the present disclosure are directed toward methods and devices that include an apparatus that is configured and arranged to form a communication bridge from one such chat room to another chat room. In such examples, individual users may communicate with other users on disparate chat rooms in real-time via the communication bridge. The ability to form communication bridges may be provided as a commercially available communication bridging service which may be purchased and/or subscribed to by individuals and/or larger customers alike. Examples of the present disclosure relate to management of communication bridges for such customers. By providing management of such communication bridges, a customer such as a corporation and/or an educational institution can monitor use of the communication bridging service by individual users, while allowing the individual users to utilize the communication bridging service without forming an individual account.

In an example embodiment, a VoIP server is configured and arranged to transmit chat messages between a plurality of disparate chat rooms accessible by end-users of a communication bridging service. In such embodiments, the VoIP server can form such communication bridges by providing a plurality of modules, including a user interface module, an application module, and a database module. The user interface module can be configured and arranged to receive from users of a first chat room, a request to form a communication bridge (e.g., a tube) between the first chat room (such as Slack) and a second chat room (such as Fleep). The database module can be configured and arranged to store configuration data corresponding to the communication bridge, as well as authentication data for users of the respective chat rooms. The application module can form the communication bridge by authenticating end-users of the first chat room and end-users of the second chat room, and forming the communication bridge responsive to authentication of the end-users, in accordance with processes described herein. Once the communication bridge is formed, the application module can transmit messages between users of the first chat room and users of the second chat room according to defined parameters of the communication bridge. The transmitted messages may be viewable in real-time by the users of the first and second chat rooms in a common interface.

In other specific example embodiments, a VoIP communication server is configured and arranged to transmit chat messages between a plurality of protocol-disparate chat rooms via a communication bridging service available to various customers which subscribe to and/or have accounts with a VoIP service provider (e.g., in a unified communications setting). In such examples, the VoIP communication server comprises a uniform resource locator (URL) generation module configured and arranged to facilitate formation of a communication bridge between a first protocol-disparate chat room including at least two participants and a second protocol-disparate chat room including at least two participants. The URL generation module facilitates formation of communication bridges by, in response to receipt of a request from a first participant of the first chat room to form the communication bridge, identifying the first participant as being associated with a network address of a customer of the communication bridging service. The URL generation module redirects the participant to a customer-specific account provided by the communication bridging service and associated with the customer. Moreover, the URL generation module generates, via the customer-specific account, a URL for the communication bridge according to the request received from the first participant, and identifies a first protocol associated with the first chat room and a second protocol associated with the second chat room. The VoIP communication server further includes an assimilation and processing module configured and arranged to transmit chat messages between the first chat room and the second chat room, by receiving from the URL generation module, an identification of the first protocol and the second protocol, and accessing a database storing specifications for the first protocol and the second protocol. The assimilation and processing module translates the first message into a first translated message using the specifications for the first protocol and the second protocol in response to receipt of a first message from a participant of the first chat room or from a participant of the second chat room, and transmits the first translated message to the participants of the first chat room and the participants of the second chat room.

In other specific example embodiments, a VoIP communication server configured and arranged to transmit chat messages between a plurality of disparate chat rooms is provided. In such examples, the VoIP communication server includes a first user interface (UI) module configured and arranged to receive from a first user of a communication bridging service, a request to form a communication bridge between a first chat room and a second chat room, where the first user is associated with the first chat room. The VoIP communication server further includes a URL generation module configured and arranged to facilitate formation of the communication bridge. The URL generation module can form the communication bridge by generating a URL associated with the communication bridge in response to receipt of the request. The URL generation module identifies a first chat room protocol associated with the first chat room and a second chat room protocol associated with the second chat room. The first chat room protocol and the second chat room protocol may differ in terms of transfer protocol used, message format used, or authentication process used, and in some instances may be referred to as disparate chat room protocols.

In such example embodiments, the VoIP communication server also includes a second user interface (UI) module configured and arranged to convey the generated URL to a second user of the communication bridging service, where the second user is associated with the second chat room. The VoIP communication server also includes an assimilation and processing module configured and arranged to transmit chat messages between the first chat room and the second chat room. The assimilation and processing module transmits such chat messages by first receiving from the URL generation module, an identification of the first chat room protocol and the second chat room protocol. The assimilation and processing module then accesses a database storing specifications for the first chat room protocol and the second chat room protocol. In response to receipt of a message from a participant of the first chat room or from a participant of the second chat room, the assimilation and processing module translates the received message into a new message (e.g., a translated message) using the specifications for the first chat room protocol and the second chat room protocol. The assimilation and processing module then transmits the new message to the participants of the first chat room and the participants of the second chat room.

In additional example embodiments, a method for facilitating communication between disparate chat rooms is provided. Such exemplary methods include receiving at a VoIP server, a request from a first participant of a first protocol-disparate chat room to form a communication bridge between the first chat room and a second protocol-disparate chat room, wherein each of the first and second chat rooms include at least two participants. The method includes determining whether or not the first participant is associated with a network address of a customer of the communication bridging service, in response to receipt of the request from the first participant, and generating a URL for the communication bridge according to the request received from the first participant, and based on the determination. The VoIP server can then translate, via the generated URL, chat messages using the specifications for the respective chat rooms, and relay the translated chat messages to all chat rooms associated with the communication bridge.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving disparate chat rooms. In certain implementations, aspects of the present disclosure have been shown to be beneficial when used in the context of providing communication services between various users and/or groups of users that may utilize different chat rooms. Moreover, aspects of the present disclosure have been shown to be beneficial when used in the context of providing VoIP communication services. While the disclosure is not necessarily limited to chat rooms, chat and/or text message communication, chat rooms are used in the following discussion to exemplify certain specific advantageous embodiments. Additionally, while the present disclosure is not necessarily limited to VoIP communication systems as described herein, for purposes of facilitating understanding and appreciation of certain embodiments, the following discussion uses such VoIP-based services and systems in the context and on behalf of a telecommunication system of client entities which subscribe to such services from a VoIP telecommunication service provider (with a server).

Chat rooms can be used to share information via text with a group of other users. Different types of chat room rooms offer real-time (or near real-time) text transmission over the Internet. Instant messaging (IM) is one such type. Generally speaking, the ability to converse with multiple people in the same conversation differentiates chat rooms from other messaging programs, which are more typically designed for one-to-one communication. A chat room refers to or includes a computing protocol as may be implemented by a computer processor circuit to facilitate the real-time or real-time transmission of text messages. Chat messages are generally short in order to enable other participants to respond quickly, for example, with message lengths limited in number. Thereby, a feeling similar to a spoken conversation is created, which distinguishes chatting from other text-based online communication forms such as Internet forums and email. Chat room may address point-to-point communication as well as multicast communication from one sender to many receivers. Chat room may also refer to or include any direct text-based and/or video-based (e.g., webcams) communication, one-on-one chat or one-to-many group chat (formally also known as synchronous conferencing), using tools such as instant messengers, Internet Relay Chat (IRC), and talkers. Chat room includes web-based applications that allow communication which is often directly addressed, but anonymous between users in a multi-user environment. The users in a particular chat room are generally connected via a shared interest or another similar connection, and chat rooms exist catering for a wide range of subjects. However, different types of chat rooms (e.g., chat rooms provided by different chat service providers) lack the ability to communicate with one another in real-time.

Aspects of the present disclosure provide for the creation of bi-directional collaborative environments involving a plurality of chat rooms. As a specific example, one of the embodiments disclosed herein might be used to provide a communication bridge (e.g., a tube) for chat communication between Google Hangouts and Slack. By providing a communication bridge between Google Hangouts and Slack, users of the disparate chat rooms can communicate in real-time despite using different chat rooms implementing different (and perhaps incompatible) communication protocols. Disparate chat rooms refer to or include chat rooms that include or comprise fundamentally different aspects, and can use different and perhaps incompatible communication protocols. Unlike email servers that may utilize simple mail transfer protocol (SMTP), various chat rooms (e.g., chat room services) and even isolated instances of the same type of chat room lack the ability to communicate with one another as there is no universal protocol for chat communication.

In accordance with more specific aspects of the present disclosure, a VoIP computer server is provided which is configured and arranged to form a communication bridge between such Google Hangouts and Slack chat rooms. The VoIP server, as described herein, comprises a user interface (UI) module configured and arranged to receive requests from end-users to form a communication bridge between Google Hangouts and Slack. The VoIP computer server further comprises an application module configured and arranged to transmit chat messages between Google Hangouts and Slack by authenticating end-users of the respective chat rooms, forming the communication bridge according to stored configuration data, and transmitting the chat messages via the communication bridge.

As an illustration, two teams (Team A and Team B) may collaborate on a project, and each team may have chat rooms established to facilitate communication among the team members. Team A can collaborate using Slack, whereas Team B can collaborate using Skype. In accordance with examples of the present disclosure, members of Team A using Slack can communicate with members of Team B using Skype in real-time. In order to facilitate the communication between Team A and Team B, a portal is created which includes a uniform resource locator (URL) that connects Team A and Team B. A member of Team A can create a portal in order to connect with Team B, and provide the URL for the generated portal with Team B. Once a member of Team B connects to the portal via the URL, a communication bridge is formed between Team A and Team B which allows the two teams to communicate with one another in real-time despite using disparate chat rooms. The members of Team A and Team B that facilitate the formation of the communication bridge between the two chat rooms are users of a communication bridging service, such as may be made available by a VoIP service provider.

Each respective portal that is formed has a unique URL that can be shared with any number of teams, such that any number of disparate chat rooms can be connected to one another. When team members of a first chat room connect to the portal of a second chat room via the URL of the respective portal, a communication bridge is formed between the first chat room and the second chat room and messages posted in one of the chat rooms will be posted to the other chat room.

In accordance with examples of the present disclosure, the VoIP server can maintain a set of programming instructions specifying how messages received in one communication protocol can be translated into another communication protocol. Using such programming instructions, messages received from a chat room using a first communication protocol are translated to a second communication protocol that is accessible by a different chat room, and bi-lateral communication is facilitated between disparate chat rooms that otherwise would be incapable of communicating with one another in real-time or near-real-time. Disparate (e.g., different) chat rooms can use different application programming interfaces (APIs), and each API can differ significantly in terms of communication protocols used. Examples of communication protocols used in chat rooms include webhooks, websockets, hypertext transfer protocol long-polling, and extensible messaging and presence protocol (XMPP), among others. For instance, Slack can use websockets whereas Google Hangouts can use XMPP. Disparate chat rooms may differ in other regards. For instance, each respective type of chat room may differ in terms of transport protocol used, message format used, authentication procedures used, and/or other features. Disparate chat rooms can use a same communication protocol but differ in other aspects, such as methods of data storage, data structure, and/or messaging capabilities. The VoIP server can maintain a set of programming instructions for translating chat messages received from Slack (using websockets) to chat messages compatible with Google Hangouts (using XMPP). In another illustration, the VoIP server can maintain a set of programming instructions for translating chat message received from Skype into chat messages compatible with Fleep, each having different APIs and perhaps using different communication protocols.

As an illustration, in order to facilitate real-time or near-real-time chat between users of Google Hangouts and users of Slack over the communication bridge, the VoIP server can implement instructions specific to each chat room (e.g., instructions specific to Google Hangouts, and instructions specific to Slack). In this context, at one end of the communication bridge the VoIP system implements the steps that are taken to access communication with Google Hangouts, with the API used by Google Hangouts. At the other end of the communication bridge where connectivity is to be realized with Slack, the VoIP system implements the steps that are taken to access communication with Slack, with the API used by Slack and as described at https://get.slack.help/hc/en-us/articles/205138367-Troubleshoot-Slack-connection-issues. The VoIP server facilitates the communication over the communication bridge between Google Hangouts and Slack using particular programming instructions specific to translating messages between Google Hangouts and Slack. In such a manner, a different set of programming instructions may be maintained by the VoIP server for facilitating communication between each of the disparate chat rooms. Once such communication bridge is formed, chat messages can be disseminated in real-time or near real-time between chat rooms that are connected via the communication bridge.

In accordance with examples of the present disclosure, the VoIP server can allow an end-user to select a type of chat room to use to create a communication bridge. For instance, the URL for a portal can be sent to a third party inviting the third party to form a communication bridge with another chat room, via the URL. Upon receipt of the URL, the VoIP server can provide the third party user with a list of chat rooms which may be selected by the third party user to form a communication bridge. Once the third party user selects a particular chat room to use, the steps described herein may be employed by the VoIP server to facilitate formation of the communication bridge with the selected chat room. In some examples, the VoIP server can automatically discover what chat room the third party is using, and enable formation of a communication bridge with any such chat room that is discovered.

According to examples of the present disclosure, communication bridges may be created, paused, and deleted using a communication bridging service provided by the VoIP service provider via the VoIP server. The communication bridging service can be provided by the VoIP service provider, and perhaps on a fee basis. Moreover, communication bridges associated with a particular end-user or client of the communication bridging service can be viewed and managed via a management console (e.g., communication bridge management console) provided via the VoIP server. Using the management console, a user may create a communication bridge by creating a portal and sharing the portal URL with various team members as described above. As used herein, a portal refers to or includes a specifically configured website that may be used to form a communication bridge with a particular chat room, and which is associated with a particular URL. For instance, a group of Twitter users communicating in a Twitter chat room, may wish to communicate with a group of users communicating in a Skype chat room. One of the users from the Twitter chat room may create a portal with a particular URL, which can be accessed by the users of the Skype chat room to create a communication bridge between the Twitter chat room and the Skype chat room. In such a manner, the portal and associated URL allow for the formation of communication bridges between disparate chat rooms.

Using the management console, portals and communication bridges associated with a particular user may be managed in a number of ways. For instance, using the management console, the user that established the communication bridge may subsequently pause the communication bridge such that messages that are posted in one of the chat rooms will not post to the other chat rooms while paused. The user can further delete the communication bridge, such that the respective chat rooms are no longer connected and messages will no longer be shared. The user can also delete portals via the management console, thereby preventing any other communication bridges from connecting to the portal, without deleting any of the current communication bridges associated with the portal. In some examples, access to portals may be regulated by an administrator so as to limit who can form a communication bridge using the portal URL. For instance, a temporary code that expires after a threshold period of time (such as fifteen minutes) may be generated when the user of the communication bridging service creates a portal, and the temporary code may be used by other users to access the portal and thereby form a communication bridge. However, after the expiration of the temporary code, additional users may be prohibited from accessing the portal and therefore additional users are prohibited from forming a communication bridge using the portal.

Each disparate chat room may utilize different respective log in credentials for users. In accordance with examples described herein, the VoIP server may store user credentials for each disparate chat room, such as authentication tokens (OAuth), security tokens, usernames and passwords (or some combination thereof) using envelope encryption. Envelope encryption refers to or includes an encryption algorithm that allows users to store, transfer and use encrypted data by encapsulating data keys (DKs) in an envelope. According to exemplary embodiments described herein, such keys can be managed with a hardened security appliance that establishes a domain as a cooperative collection of trusted entities. The domain includes a set of trusted entities, a set of rules, and a secret key, referred to as a domain key. The domain keys are rotated daily, whereby all existing keys encrypted under the outgoing domain key are re-encrypted under a new domain key.

In another example embodiment, an apparatus includes a VoIP server configured and arranged to form a communication bridge between disparate chat rooms using a secure interface. The apparatus can receive a request from a user of a first chat room to form a communication bridge with a user of a second chat room. In response, the apparatus can authenticate the plurality of users using encrypted user credentials and a particular code identifying the communication bridge to be formed. In example implementations, the apparatus can transmit messages from users of the first chat room to users of the second chat room in a common interface, and in response to such authentication. To ensure that the interface used by the users of each disparate chat room is secure, a separate data key can be issued to encrypt the credentials of each account for the communication bridging service. For instance, an account identifier is associated with a particular communication bridging service account, and a data key is used to encrypt the account credentials. The encrypted account credentials and the data key are combined into an envelope which is stored by the VoIP service provider.

Accordingly, in the following description various specific details are set forth to describe specific examples presented herein. It should be apparent to one skilled in the art, however, that one or more other examples and/or variations of these examples may be practiced without all the specific details given below. In other instances, known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Figure 1:
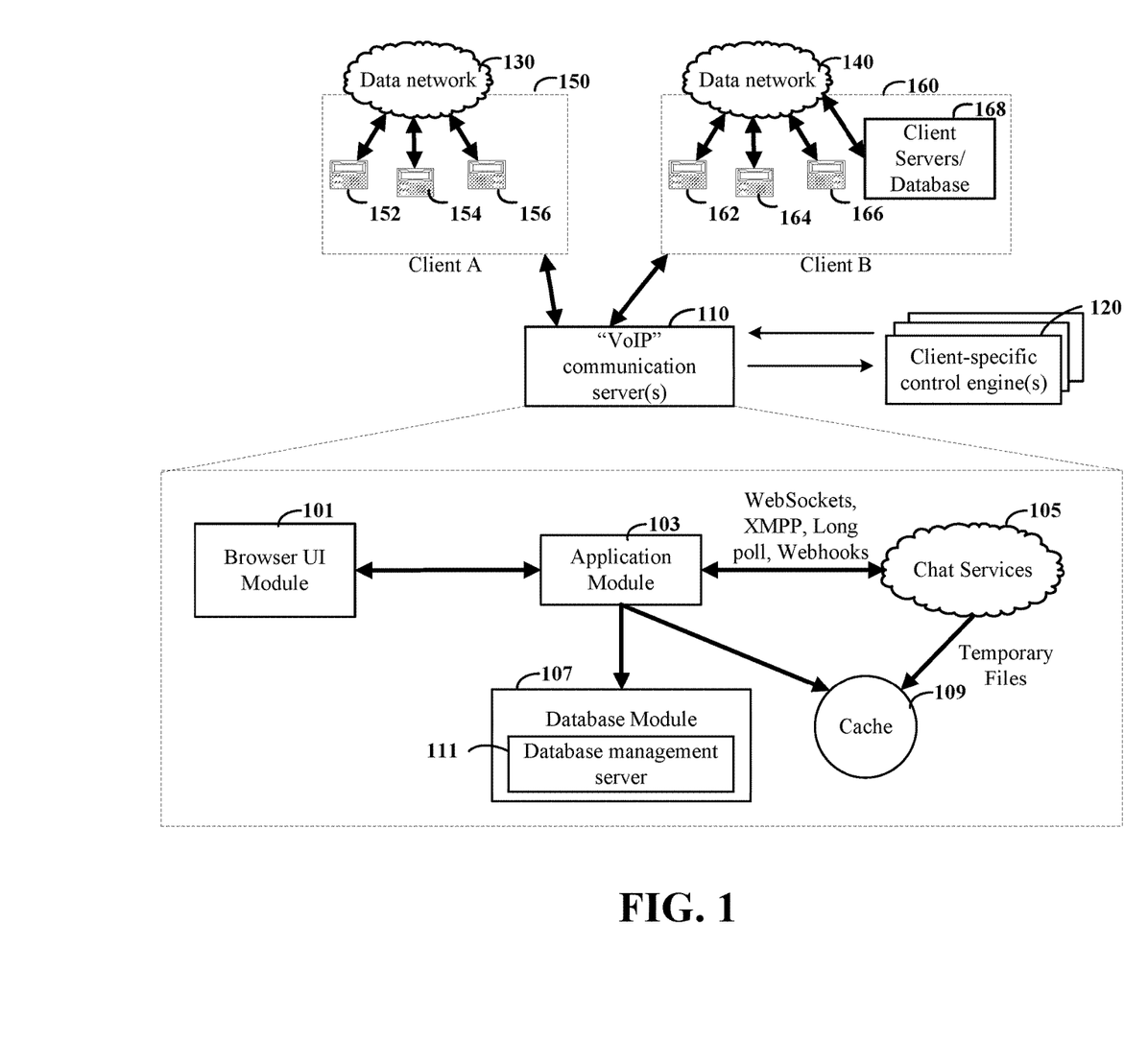
FIG. 1 shows a block diagram of a system for communication bridging among disparate chat rooms, consistent with embodiments of the present disclosure.

Turning now to the figures, FIG. 1 shows a block diagram of a system for communication bridging (e.g., forming communication bridges) among disparate chat rooms, consistent with embodiments of the present disclosure. Such communication bridging may be implemented using a Voice over Internet Protocol (VoIP) system integrating various telecommunications services. As illustrated in the upper part of FIG. 1, various servers may be included in the VoIP system. These servers implement communication bridging as exemplified in the lower part of FIG. 1. In various embodiments, functionality for implementing the systems or methods of the present invention may be distributed among any number of client and/or server components. For example, various software modules may be implemented by the server(s) for performing various functions in connection with the present invention, and such modules may be implemented to run on server and/or client components.

As illustrated in FIG. 1, the VoIP system includes a VoIP communication server 110 configured to provide VoIP communication for a plurality of endpoint devices 152, 154, 156, 162, 164, and 166 connected in one or more data networks 130 and 140. The endpoint devices are circuit-based instruments that are used by personnel (or users) and include VoIP-enabled circuitry (e.g., IP phones, smart phones, tablets, and/or desktop computers with appropriate VoIP software applications) and/or non-VoIP endpoint devices (e.g., plain old telephone service (POTS) telephones and cellular-capable devices). Each endpoint device is respectively associated with an account of a respective client. Endpoint devices may be associated with a particular client account by registering the endpoint device with a particular client account serviced by the VoIP communication server. Registered devices for each client account may be listed in a respective account settings file (not shown) stored by the VoIP communication servers 110. In this example, endpoint devices 152, 154, and 156 are associated with an account 150 for a first client A and endpoint devices 162, 164, and 166 are associated with an account 160 for a second client B.

The system includes one or more processing circuits configured to implement client-specific control engines 120, which are configured to adjust the VoIP communication provided for each client account according to a respective set of control directives. For instance, the client-specific control engines 120 may adjust routing of a VoIP communication for a client account by generating client-specific sets of control data to the VoIP communication server 110.

Different embodiments may implement the client-specific control engines 120 in various locations. For example, client-specific control engines 120 for one or more client accounts may be implemented in a central server connected to, or incorporated with, the VoIP communication server(s) 110. Additionally or alternatively, one or more client-specific control engines 120 may be implemented by one or more processing circuits maintained by the client (e.g., server/database 168). Similarly, the control directives may be stored locally within the client-specific control engines, or stored remotely (e.g., in a centralized database, in a database maintained by the client or a combination thereof).

As previously described, client-specific control engines may be used to facilitate adjustment of a variety of remote services including, for example, VoIP communication services such as VoIP calls, audio and/or video conferencing, general private branch exchange services, packet switching, chat, and traffic management as well as non-VoIP services including, but not limited to, website hosting, remote data storage, remote computing services, and virtual computing environments. One or more of such services may be provided, for example, by a cloud computing network having one or more servers configurable for a plurality of clients.

As illustrated in the lower portion of FIG. 1, various example embodiments may include a VoIP communication server having a plurality of modules (e.g., sets of task-specific CPU instructions). The system (via the VoIP communication server 110) can include a user interface (UI) module 101, an application module 103, and a database module 107, among other components. The database module 107 stores metadata such as external chat service identity details (e.g. credentials, email, etc.), communication bridge and portal definitions as well as miscellaneous metadata including security logs and/or authorization handshake states. The database module 107 may include a relational database management system (RDMS) which stores data securely and returns that data in response to requests from other applications, as implemented by a database management server 111. For instance, the database module 107 may return data to the application module 103 in response to requests from the application module 103. The database module 107 may include and/or interface with a database management server 111 such as a postgres server, with a multiple availability zones (e.g., multi-AZ) configuration. In a multi-AZ configuration, the RDMS automatically provisions and maintains a synchronous standby replica of data in a different isolated location known as an availability zone. In such configurations, a primary database instance is synchronously replicated across availability zones to create a standby replica which provides data redundancy, eliminates input/output (I/O) freezes, and minimizes latency spikes during system backups. For example, the database module 107, via a RDMS with a multi-AZ configuration may store metadata associated with communication bridges, portals, and/or end-users of a communication bridging service across a plurality of storage locations (e.g., availability zones). By implementing a multi-AZ configuration, the database module 107 maintains a synchronous standby replica of the metadata (e.g., external chat service identity details, communication bridge and portal definitions, security logs, authorization handshake states, etc.).

Additionally, the database module 107 can provide encryption of the stored metadata in a user-configurable manner. For instance, end-users and/or administrators of the communication bridging service may specify a manner in which data associated with portals, communication bridges, particular end-users, and/or a plurality of end-users (e.g., a customer) is encrypted. An end-user and/or administrator may specify that volumes in the RDMS may be encrypted at rest in response to selection of an encryption option for the RDMS. Data that is encrypted (e.g., at rest and/or during operation) includes the underlying volumes in the relational database, automated backups of the volumes in the relational database, replicas of the volumes in the relational database, and snapshots.

Referring again to FIG. 1, the system (via the VoIP communication server 110) includes an application module 103 that relays messages between chat services 105 according to communication bridge definitions. To achieve this, the application module 103 may open and maintain active connections with chat rooms that use duplex communication protocols such as Web Sockets, extensible messaging and presence protocol (XMPP), and/or long poll. For example, in order to route communication between chat rooms in real-time or near real-time, the application module 103 can listen for incoming hypertext transfer protocol (HTTPS) requests as may be utilized by webhook-based chat services. Webhooks refers to or includes program code executable to cause events on one site to invoke specified behavior on another computer. Webhooks can be triggered by an event, such as pushing code to a repository or a comment being posted to a blog, and when that event occurs, the source site makes an HTTP request to the URL configured for the webhook performs the specified behavior. As may be implemented by application module 103, when a chat message is received from an endpoint device associated with a client, such as endpoint device 152, the chat room of the chat message can be identified. The application module 103 may then determine if the identified chat room corresponds to a chat room in any presently-defined and active communication bridge. In response to a determination that the identified chat room corresponds to a chat room that is part of a presently-defined and active communication bridge, the received chat message is relayed to all other chat rooms that belong to the communication bridge. In such a manner, the chat message received via the first chat room is routed to all chat rooms that are connected to the first chat room via the communication bridge. To perform such routing, the application module 103 maintains a topology cache 109 that includes the set of all connected chat rooms. The topology cache may include communication bridges with chat rooms used by end-users external to a customer and/or internal to a customer. In such a manner, end-users are able to communicate with both internal and external team members across disparate chat rooms in real-time or near real-time. Whenever communication bridges are added, removed, activated, and/or deactivated, this topology cache 109 is updated correspondingly to ensure correct routing.

In addition to routing, the application module 103 is configured and arranged to recover chat services in situations when one or more chat services 105 experience a full or partial outage. Such recovery ensures that outage of one of the chat services does not influence routing for other chat services 105, and provides for a gradual recovery that does not overload any chat service that comes back from an outage. Further, the application module 103 is configured and arranged to provide a set of services for the UI module 101 in order for agents (e.g., end-users) to authenticate and manage communication bridges and portals. These services may be provided by an application programming interface (API) which is not available for external use beyond the UI module 101.

The UI module 101 includes various aspects that allow end-users of the VoIP system to manage the various communication bridges and portals available to the end-users. According to various embodiments, the UI module 101 is configured and arranged to generate a communication bridge homepage and a communication bridge management console accessible by end-users. The management console enables agents (e.g., users of the communication bridging service) to provision identities by varying methods. In some examples, the management console is configured and arranged to authenticate identities with corresponding chat services using a token-based authentication and authorization protocol (such as OAuth, for instance). Additionally and/or alternatively, the management console is configured and arranged to authenticate identities with custom credentials. When authenticated, agents (e.g., users of the communication bridging service) are able to manage (e.g., create, delete, pause, and play) their communication bridges and portals, as well as manage subscriptions to the service providing the communication bridge capabilities.

In an example embodiment, the UI module 101 is implemented by various high-level programming languages. For example, the UI module 101 may be implemented in TypeScript, a typed variation of JavaScript that translates into plain JavaScript. Similarly, the UI module 101 may use a JavaScript library such as React for building the UIs and a modular application architecture such as Flux for building end-user side web applications. Using the various high-level programming languages, the UI module 101 is configured and arranged to generate a single page application (SPA), which is transmitted to the application module 103 and subsequently provided to the respective end-users via the VoIP communication server(s) 110. An SPA refers to and/or includes a web application that loads a single hyptertext markup language (HTML) page and dynamically updates that page as a user interacts with the application. Examples are not limited to the scripting languages provided. For instance, exemplary aspects may be implemented using various scripting languages including Postgres PL/pgSQL for the database module 107, Erlang for the application module 103, Typescript for the UI module 101, as well as Node.js and/or Bash for the UI module 101, among others.

Figure 2A:
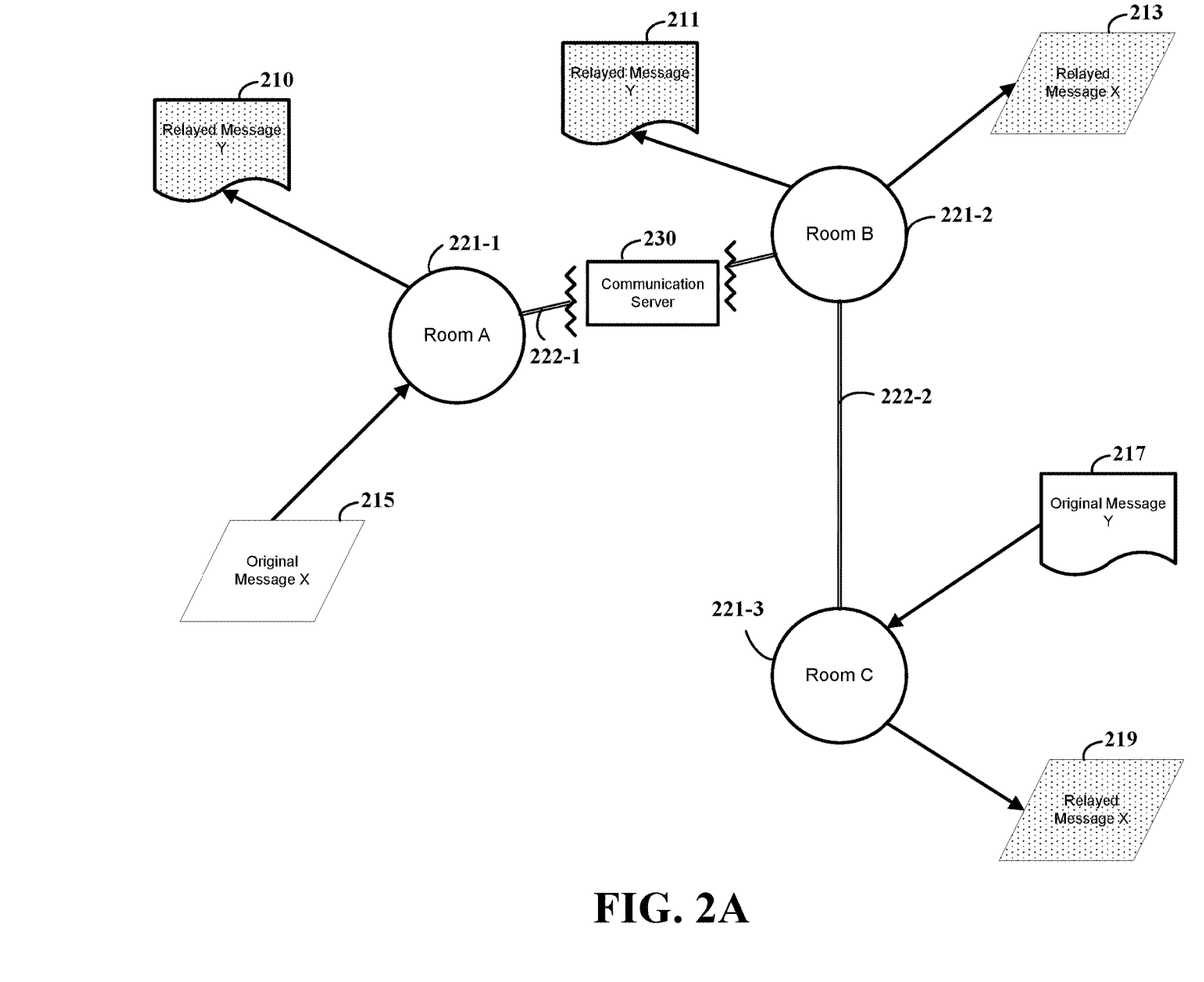
FIG. 2A shows a flow diagram for transmission of messages between disparate chat rooms, consistent with embodiments of the present disclosure.

Exemplary embodiments may include use of two-way bridges, or "communication bridges," between different chat rooms as illustrated in FIG. 2A. Seen in FIG. 2A, communication bridges 222-1 and 222-2 may connect various chat rooms 221-1, 221-2, and 221-3 (room A, room B, and room C, respectively). A communication bridge connects two chat rooms or channels into a virtual connection. Communication bridges can be arranged in an arbitrary topology. Each room retains its own copy of chat history, making chat-based cross-company communication compliant. For example, a group of end-users utilizing a first chat room corresponding to chat room A (221-1) can designate a channel corresponding to communication bridge 222-1 for communicating with end-users utilizing a second chat room corresponding to chat room B (221-2). The communication bridge 222-1 can be used to facilitate chat communication between room A and room B, while allowing each of room A and room B to retain a copy of the chat history. Additionally, because room B is also connected to room C (221-3) via communication bridge 222-2, messages sent from end-users of room A to room B are also sent to end-users of room C. In such a manner, message 215 (original message X) may be transmitted to users connected to rooms 221-2 and 221-3, resulting in users receiving relayed messages 213 and 219 (respectively). Because each of room A, room B, and room C are connected via communication bridges 222-1 and 222-2, respectively, chat messages may be shared across each of the plurality of rooms, and message 217 (original message Y) may be transmitted to users connected to communication bridges 221-1 and 222-2, resulting in users receiving relayed messages 210 and 211 (respectively). As illustrated in FIG. 2A, a communication server 230 (such as a VoIP communication server) can facilitate the communication between room A 221-1 and room B 221-2, as discussed with regard to FIG. 2B.

Example embodiments allow for the creation of reliable, bi-directional collaborative environments involving unrelated organizational units using different chat rooms. Such example embodiments allows teams to talk to each other without switching chat rooms. For example, if a team on a first chat room (such as Slack) has to collaborate with a team that uses a second chat room (such as HipChat), it is not uncommon for both teams to use a third chat room (such as Skype) in addition to their main chat application. In accordance with example embodiments described herein, a channel in Slack can be shared with a room in HipChat, ensuring that both teams keep using their main chat application without having to switch chat rooms, both teams own a copy of the communication record (i.e., chat history), and each team controls access to their side of the shared communication environment.

Figure 2B:
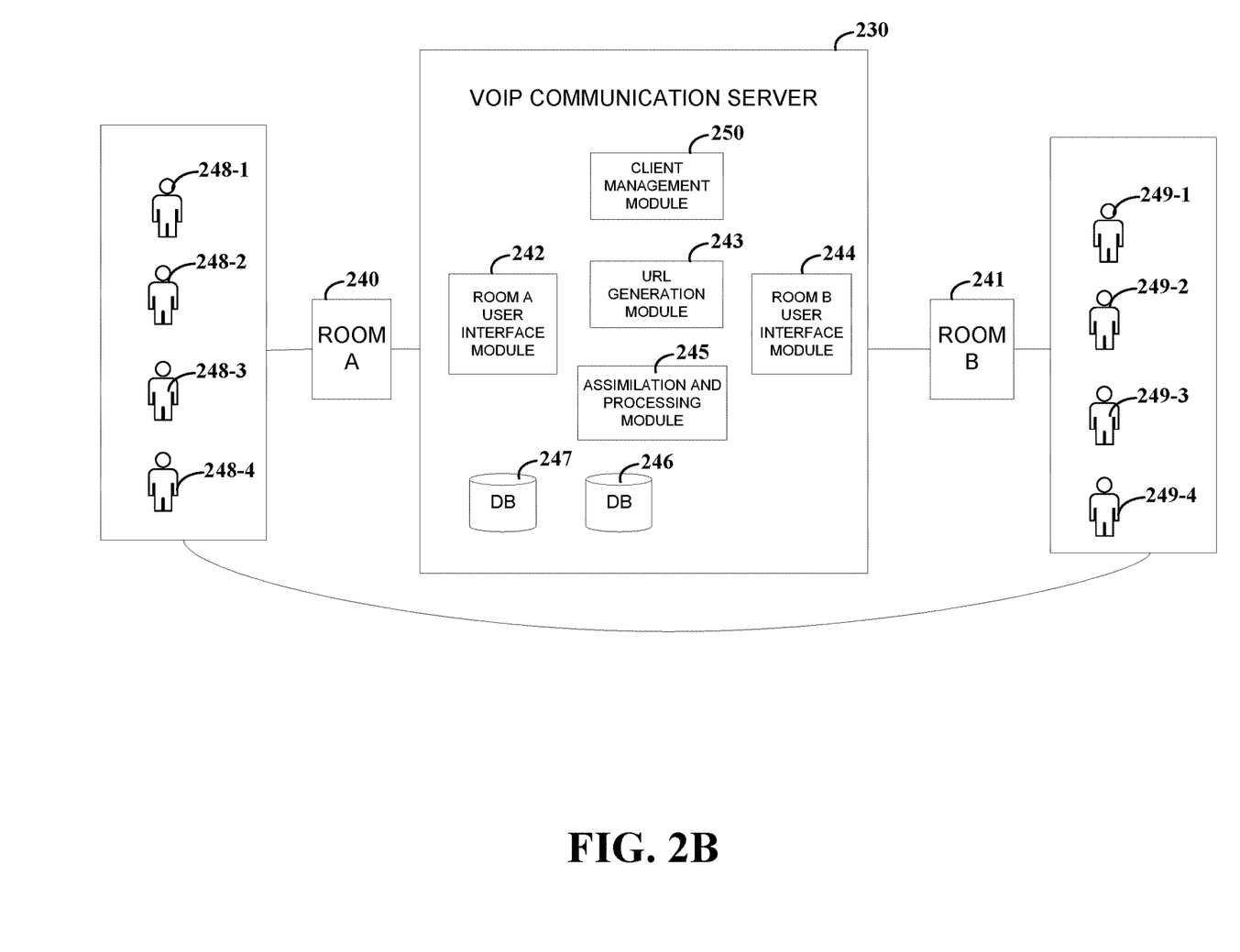
FIG. 2B shows a block diagram of a system for management of communication bridges between disparate chat rooms, consistent with embodiments of the present disclosure.

Exemplary embodiments may include use of a VoIP communication server that is configured and arranged to transmit chat messages between a plurality of disparate chat rooms, as illustrated in FIG. 2B. The VoIP communication server 230 can include a first user interface (UI) module 242 that is configured and arranged to receive from a first user of a communication bridging service, a request to form a communication bridge between a first chat room and a second disparate chat room. For instance, user 248-1, who is using room A 240 to communicate with participants 248-2, 248-3, and 248-4 can submit a request to the VoIP communication server 230 to form a communication bridge between room A 240 and room B 241. In such a manner, the VoIP communication server 230 can include a first UI module 242 configured and arranged to interface with participants of room A 248-1, 248-2, 248-3, and 248-4 (referred to collectively as room A participants 248), and a second UI module 244 configured and arranged to interface with participants of room B 249-1, 249-2, 249-3, and 249-4 (referred to collectively as room B participants 249).

The VoIP communication server 230 can also include a uniform resource locator (URL) generation module 242 configured and arranged to facilitate formation of the communication bridge. In some examples, the URL generation module 242, in response to receipt of a request from a first participant of the first chat room (e.g., room A 240) to form the communication bridge, can identify the first participant as being associated with a network address of a customer of the communication bridging service. For instance, the URL generation module 242 can identify the first participant as being associated with the network address of the customer based on an email domain of the first participant. While requesting the formation of a communication bridge, the participant can provide identifying information including a name and email address. The domain of the email address may be identified (e.g., @megacorporation.com), and matched to a domain belonging to the customer. Examples are not necessarily so limited, however, and the URL generation module 242 can identify the participant as being associated with the customer by other means, including IP address, name, etc. Once the participant is associated with the customer, the URL generation module 242 can redirect the first participant to a customer-specific account provided by the communication bridging service and associated with the customer. For instance, the URL generation module 242 can redirect the first participant to a customer-specific URL associated with the customer-specific account. The customer-specific URL refers to or includes a URL created by the communication bridging service for use by a particular customer. For instance, a first customer-specific URL could be created for a company, a second customer-specific URL could be created for an academic institution, and a third customer-specific URL could be created for a government office. Each respective customer-specific URL may be accessed by members of the customer (e.g., employees of the company, faculty and/or students of the academic institution, and/or employees of the government office), such that the members of the customer may utilize the communication bridging service.

The URL generation module 242 can facilitate formation of the communication bridge by generating a URL associated with the communication bridge in response to receipt of the request, and identifying a first chat room protocol associated with the first chat room and a second chat room protocol associated with the second chat room. For instance, the URL generation module 242 can access databases 247 and 246 to identify the chat room protocols used by each of room A 240 and room B 241. As described herein, the first chat room protocol and the second chat room protocol may differ in terms of transfer protocol used, message format used, and/or authentication process used, etc. Once the URL is generated, the second UI module 244 can convey the generated URL to a second user of the communication bridging service. The second user (e.g., the user of room B to which the URL is sent) is a user of the communication bridging service provided by the VoIP communication server 230, and can be among the room B participants 249. Although not illustrated, in some examples, each of UI modules 242 and 244 may form at least a part of browser UI module 101 illustrated in FIG. 1.

The VoIP communication server 230 also includes an assimilation and processing module 245 configured and arranged to transmit chat messages between the first chat room and the second chat room. Although not illustrated, each of the URL generation module 243 and the assimilation and processing module 245 may form at least a part of the application module 103 illustrated in FIG. 1. The assimilation and processing module 245 receives from the URL generation module 243, an identification of the first chat room protocol and the second chat room protocol (as identified from databases 247 and/or 246), and accesses a database (e.g., 247 and/or 246) storing specifications for the first chat room protocol and the second chat room protocol. The databases 246 and 247 may be managed by the database module 107 illustrated in FIG. 1, for instance, by the database management server 111. In response to receipt of a message from a room A participant 248 or from a room B participant 249, the assimilation and processing module 245 translates the received message into a new message (e.g., translated message) using the specifications for the first chat room protocol and the second chat room protocol. The VoIP communication server 230 can then transmit the new message to the participants of room A and the participants of room B.

In some examples, the URL generation module 243 is configured and arranged to facilitate formation of multiple communication bridges with a single chat room. For instance, referring again to FIG. 2B, the URL generation module 243 may be configured and arranged to facilitate formation of a second communication bridge with room A 240 by distributing the generated URL to users of a third chat room (not illustrated in FIG. 2B), and identifying a third chat room protocol associated with the third chat room. For instance, room A 240 may be a Twitter room that uses a first protocol, room B 241 may be a Skype room that uses a second protocol, and the third chat room (not illustrated in FIG. 2B) may be a Fleep room that uses a third protocol. In response to identification of the different protocols used by each of the disparate chat rooms, the assimilation and processing module 245 is configured and arranged to transmit chat messages between the three rooms by accessing the database(s) 246 and/or 247 storing specifications for the first chat room protocol, second chat room protocol, and third chat room protocol. The assimilation and processing module 245 may then, in response to receipt of a message from a participant of one of the chat rooms, translate the received message into a new (e.g., translated) message using the specifications for the respective chat room protocols. In some instances, specifications for respective chat room protocols may be stored in one database, such as database 246, whereas programming instructions specifying how messages received in one communication protocol can be translated into another communication protocol may be stored in another database, such as database 247.

The VoIP communication server 230 also includes a customer management module 250 configured and arranged to manage a plurality of customer-specific accounts, each associated with a different respective customer of the communication bridging service. As described herein, a plurality of different customers may subscribe to the communication bridging service, and each respective customer can be associated with a different respective customer-specific account. The customer management module 250 can monitor participant actions related to communication bridges associated with each respective customer. For instance, the customer management module 250 can maintain a list of user accounts associated with each respective customer, including a user name and a type of protocol-disparate chat room associated with each respective user account. Each time a user of the customer creates (e.g., forms) and/or deletes a communication bridge using the communication bridging service, the customer management module 250 can enter a record of the transaction such that the customer can monitor activity of the users in an effective manner.

In some examples, the customer management module 250 can maintain a searchable list of events related to actions taken by each respective user account within the communication bridging service. For example, a list of authorized administrators may be given privileged access to user information in the communication bridging service, including access to view all communication bridges created by user accounts associated with each respective customer. Authorized administrators, such as administrators of the communication bridging service itself, may access information related to the communication bridging service provided to a plurality of customers. Additionally and/or alternatively, authorized administrators, such as administrators of a particular customer, may access information related to the communication bridging service provided to the particular customer. In such examples, authorized administrators for a particular customer may be provided (by the communication bridging service) with a display including a list of all communication bridges created by user accounts associated with the particular customer. The authorized administrators can add and/or remove users that may access the communication bridging service, and implement an access control policy to enable safe and auditable use of the communication bridging service. Such an access control policy may specify individual users that are permitted to use the communication bridging service, types of chat room accounts that may be used within the communication bridging service, among other control aspects. In some examples, the authorized administrators (of the communication bridging service as well as the customer) can similarly add and/or remove other authorized administrators.

Figure 3:
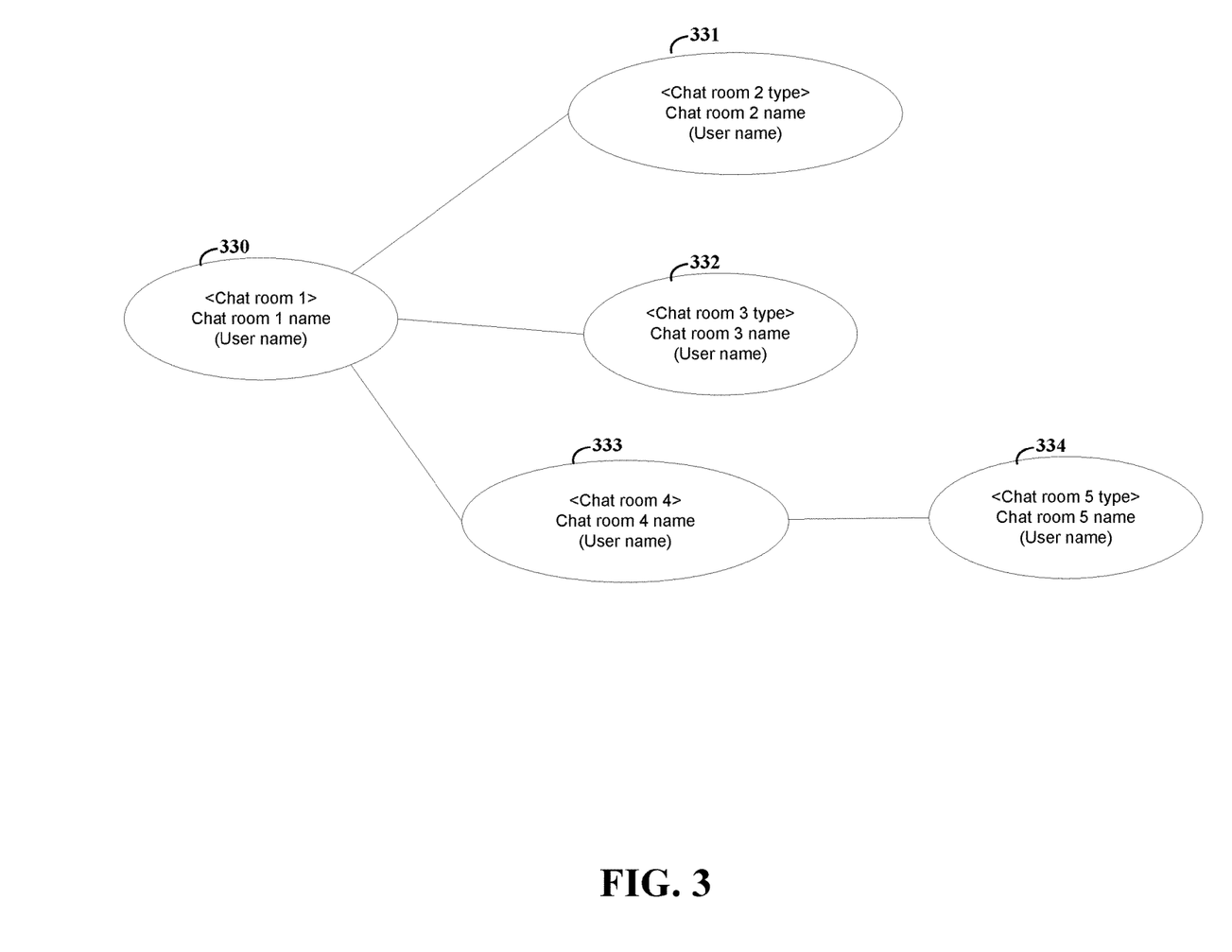
FIG. 3 shows a flow diagram for transmission of messages between disparate chat rooms, consistent with embodiments of the present disclosure.

As illustrated in connection with FIG. 3 (and consistent with the system illustrated in FIG. 1), in additional example embodiments the system may be used to connect groups on the same chat room, but from different organizational units, such as different teams or on different respective servers, or for connecting more than two teams. Each of chat rooms 330, 331, 332, and 333 may operate on different chat rooms. For instance, room 330 may operate on Fleep, room 331 may operate on Intellinote, room 332 may operate on Slack, and room 333 may also operate on Slack. When an end-user in chat room 330 posts a message, the message is posted to the other four chat rooms (e.g., 331, 332, 333, and 334) in real-time. As described with regard to FIGS. 1 and 2A and 2B, messages from one chat room are communicated to the other chat rooms via a communication bridge created between the respective chat rooms. In some embodiments, a graphical user interface (GUI) illustrating the connections between various chat rooms can be provided to end-users. Similar to that which is illustrated in FIG. 3, such GUI may illustrate the various communication bridges between the disparate chat rooms and data associated with each disparate chat room. The GUI illustrating the communication bridges formed can include identification of the chat room used, the name of the chat room, and a user name associated with the chat room.

Figure 4:
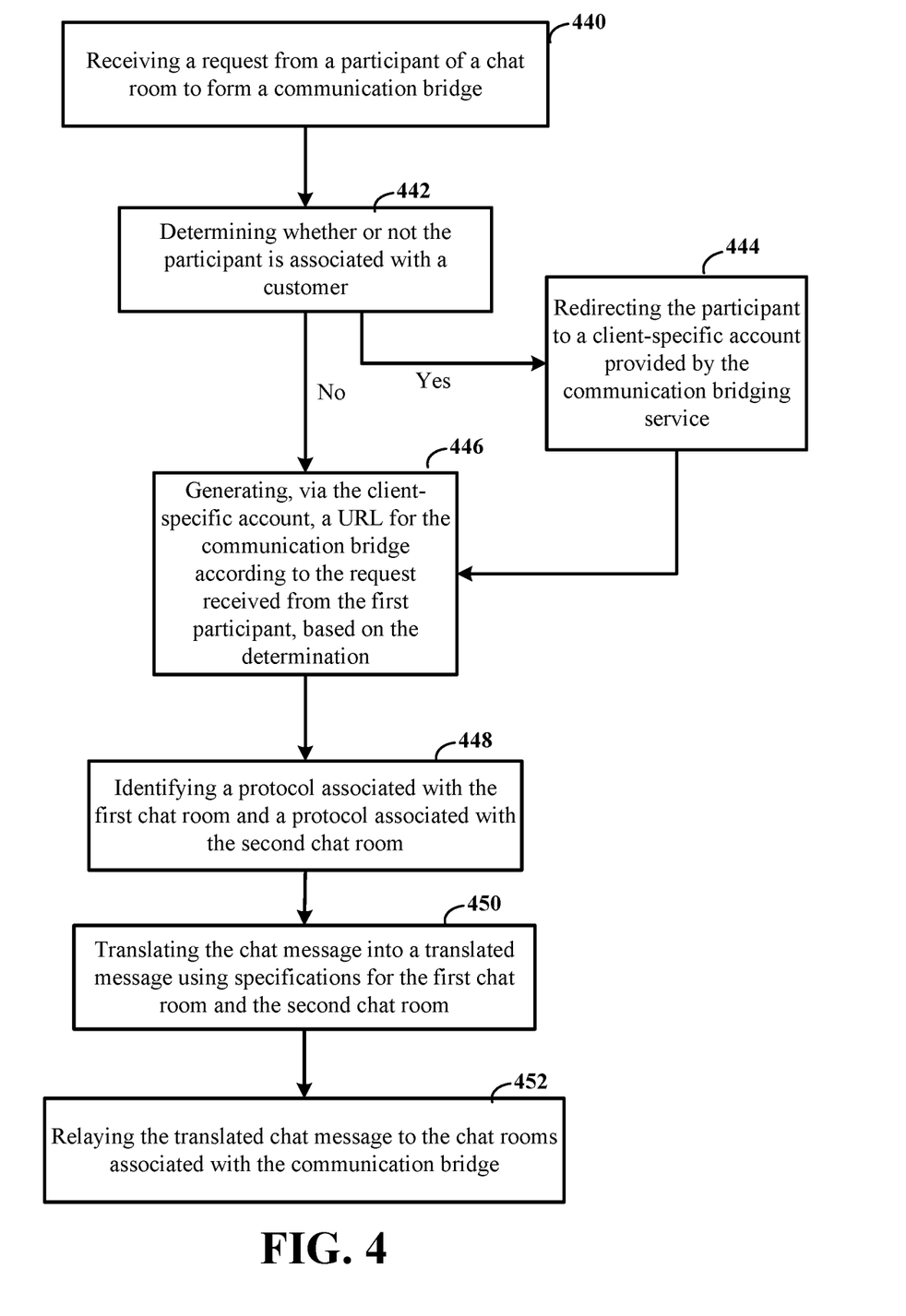
FIG. 4 shows a flow chart of a method facilitating communication between disparate chat rooms accessible by end-users of a communication bridging service.

FIG. 4 shows a flow chart of one example of a method facilitating communication between disparate chat rooms accessible by end-users of a communication bridging service, consistent with embodiments of the present disclosure. As illustrated, at block 440 the method includes receiving at a VoIP server (such as VoIP communication server 110 illustrated in FIG. 1), a request from a first participant of a first protocol-disparate chat room to form a communication bridge between the first chat room and a second protocol-disparate chat room. Such request may be in the form of receiving a chat message from a first user associated with a first chat room and intended for a second user associated with a second chat room. At block 442, the method includes determining whether or not the first participant is associated with a network address of a customer of the communication bridging service. If, at 444, the participant is associated with a network address of a customer, the method includes redirecting the first participant to a customer-specific account provided by the communication bridging service and associated with the customer. In such an example, a participant associated with ABC Company would be redirected to the customer-specific account associated with ABC Company. If instead, the participant is not associated with a network address of a customer, the method proceeds directly to 446. At 446, the method includes generating a URL for the communication bridge according to the request received from the first participant, and based on the determination whether or not the first participant is associated with a network address of a customer. If the participant is associated with the customer and redirected to the customer-specific account, the generated URL may include an identifier linking it to the customer-specific account. If the participant is not associated with the customer, the generated URL may be a randomly generated URL without any particular link or identifier associated with a customer.

At block 448, the method includes identifying a protocol associated with the first chat room and a protocol associated with the second chat room, as described herein. Once the protocols for the respective chat rooms are identified, a database storing specifications for the respective chat rooms may be accessed, and the chat messages may be translated using the specifications for the respective chat rooms. The messages may be translated via the URL for the communication bridge in that each disparate chat room can send a message intended for a different disparate chat room to the generated URL, and the message is translated before being transmitted to at least one disparate chat room. As such, at block 452, the method includes relaying the translated chat message to the chat rooms associated with the communication bridge. As described herein, chat messages may be relayed between the chat rooms (e.g., bi-directionally). Although examples herein describe a method of forming a communication bridge between two chat rooms, examples are not so limited. For instance, as discussed with regard to FIG. 3, communication bridges (e.g., communication bridges) may be formed between a plurality of chat rooms.

End-users may transmit communication (e.g., chat messages) across the communication bridge once the end-users are authenticated. The end-users may be authenticated using encrypted user credentials and a code identifying a communication bridge. For instance, an end-user may be invited to participate in a chat session via a communication bridge, and provided with a code particular to that communication bridge which is used to authenticate the identity of the end-user.

Various example methods include storing metadata associated with the communication bridge in a relational database management system implemented at least in part by a VoIP server. For instance, the VoIP server may interface with a RDMS that stores the metadata. In such examples, the method may include retrieving, via the VoIP server, the stored metadata associated with the communication bridge in response to a full or partial outage by the first chat room or the second chat room, and reestablishing the communication bridge between the first chat room and the second chat room. In such examples, the system is able to recover chat services in situations when one or more chat services 105 experience a full or partial outage.

In some examples, the method includes maintaining, via the VoIP server, an administrative account for a plurality of customers subscribing to the communication bridging service, wherein each respective customer includes a plurality of end-users and a list of supported chat rooms and the administrative account for each respective customer provides administrative capabilities. In such examples, the method includes forming via the VoIP server and for each end-user of the respective customer, an aggregate account that includes all chat rooms associated with the particular end-user. Similarly, the method includes maintaining for each respective administrative account, a list of communication bridges formed by end-users of the respective customer and authentication data associated with the communication bridges of the customer.

An administrative account may provide a privileged account for a particular customer. The administrative account may include a list of customer administrators that have the ability to add or remove customer administrators, and have the ability to view (but not modify) end-user accounts belonging to the customer. Similarly, the administrative account may include the ability to view all communication bridges and portals created with end-user accounts belonging to the customer, and the ability to view all security log events within the customer. Moreover, the administrative account may include the ability to add end-user accounts. Customer administrator may refer to or include a user with email/password or security assertion markup language (SAML) access to the administrative account.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits, computer processing circuits, or programmable logic circuits configured and arranged for implementing these operations/activities, as in the blocks shown in the figures. For example, as may be expressed herein, a "URL generation module" refers to or includes one or more discrete logic circuits, computer processing circuits, or programmable logic circuits configured and arranged for implementing specified operations/activities, whereas the adjective used before "module" is not intended to characterize further structure, but rather to provide antecedent reference. Similarly, it will be apparent that a server refers to and/or includes a computer processing circuit that is configured to provide services to other circuit-based devices, and a (VoIP) endpoint device (or endpoint) refers to and/or includes a communication circuit and (computer) processing circuits which are configured to establish (VoIP) communication sessions with other devices (e.g., personal computers, IP-enabled mobile phones, and tablet computers). In certain embodiments, such circuits can correspond to one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. As another example, although aspects and features may in some cases be described with regard to particular chat rooms, other chat rooms such as IRC, Campfire, Cisco Jabber, Socialcast, Yammer, HipChat, Flowdock, GroupMe, Salesforce Chatter, Lync, iMeet, Planio, Telegram, IRCCloud, Gitter, Fleep, Cisco Spark, Mattermost, Rocket.Chat, and Microsoft Teams, among others may pertain. Such modifications do not depart from the true spirit and scope of various aspects of the disclosure, including aspects set forth in the claims.

What is claimed:

1. A system comprising:
   a data-communications server to communicate chat messages among a plurality of disparate chat rooms and to provide data-communications services, including a communication bridging service, to a plurality of endpoint devices, each of the plurality of endpoint devices including communications circuitry and being linked to at least one of a plurality of entities, wherein each of the plurality of disparate chat rooms is associated with one of a plurality of respective communication protocols; and
   logic circuitry, communicatively coupled to the data-communications server, to:
      form a communication bridge between a first disparate chat room, a second disparate chat room and a third disparate chat room, for transmitting chat messages between the first chat room and the second chat room via the data-communications server;
      redirect, in response to a communication from a first participant of the first chat room, the first participant to a specific account provided by the communication bridging service and associated with said at least one of a plurality of entities; and
      generate, for transmission of chat messages between the first participant of the first chat room and participants of the respective second and third chat rooms and using the respective communication protocols, a uniform resource locator (URL) for the communication bridge to carry the chat messages for the first participant and the participants of the respective second and third chat rooms.

2. The system of claim 1, wherein the logic circuitry includes a computer processing circuit and is to relay via the data-communications server, an appropriate translation of a first message to certain or all of the plurality of disparate chat rooms associated with the communication bridge in real-time or near-real-time.

3. The system of claim 1, wherein the logic circuitry is to retrieve documents respectively characterizing the respective communication protocols.

4. The system of claim 1, wherein the logic circuitry is to direct or redirect the first participant via the URL.

5. The system of claim 1, further including a user interface (UI) module to convey the URL for the communication bridge to respective participants of the plurality of disparate chat rooms.

6. The system of claim 1, wherein the logic circuitry is to identify the first participant, based on an email domain of the first participant, as being associated with a network address of one of said at least one of a plurality of entities.

7. The system of claim 1, further including a customer management circuit to manage at least one of a plurality of specific accounts, including the specific account, associated with respective users of the communication bridging service.

8. The system of claim 1, further including a customer management circuit to manage at least one of a plurality of specific accounts associated with the communication bridging service and to monitor participant actions related to communication bridges associated with the respective specific accounts, wherein the specific account is one from among the plurality of specific accounts.

9. The system of claim 1, further including a customer management circuit to manage at least one of a plurality of specific accounts, including the specific account, associated with the communication bridging service and to maintain a list of associated user accounts, each of which indicates a user name and a type of disparate chat room.

10. The system of claim 1, further including a customer management circuit to manage at least one of a plurality of specific accounts, including the specific account, associated with the communication bridging service and to monitor actions or events associated with at least one of formation and deletion of communication bridges associated with said at least one of the plurality of specific accounts.

11. The system of claim 1, further including at least one of the plurality of endpoint devices.

12. A method for use by a data-communications server and logic circuitry communicatively coupled to the data-communications server, the method comprising:
   via the data-communications server, communicating chat messages among a plurality of disparate chat rooms, and providing data-communications services including at least one communication bridging service, to a plurality of endpoint devices, each of the plurality of endpoint devices including communications circuitry, and each of the plurality of disparate chat rooms being associated with one of a plurality of respective communication protocols; and
   via the logic circuitry and the data-communications server:
      forming a communication bridge between a first disparate chat room, a second disparate chat room and a third disparate chat room, for transmitting chat messages between the first chat room and the second chat room via the data-communications server;
      redirecting, in response to a communication from a first participant of the first chat room, the first participant via the at least one communication bridging service; and
      generating, for transmission of chat messages between the first participant of the first chat room and participants of the respective second and third chat rooms and using the respective communication protocols, a uniform resource locator (URL) for the communication bridge to carry the chat messages for the first participant and participants of the respective second and third chat rooms.

13. The method of claim 12, wherein the data-communications server provides Voice over Internet Protocol (VoIP) services for at least one of the participants.

14. The method of claim 12, further including using a customer management circuit, forming part of or communicatively coupled with the logic circuitry, to manage at least one of a plurality of specific accounts associated with a respective user of the at least one communication bridging service; and to monitor events related to one or more of: activities associated with formed communication bridges associated with each respective specific account; and formation and deletion of communication bridges.

15. The method of claim 12, wherein the logic circuitry relays via the data-communications server, an appropriate translation of a first message to certain or all of the plurality of disparate chat rooms associated with the communication bridge in real-time or near-real-time.

16. The method of claim 12, wherein the logic circuitry retrieves documents respectively characterizing the respective communication protocols.

17. The method of claim 12, wherein the logic circuitry directs or redirects the first participant to a specific URL associated with a specific account used by the data-communications server.

18. The method of claim 12, further including using a customer management circuit, forming part of or communicatively coupled with the logic circuitry, to provide a user interface (UI) module to convey the URL for the communication bridge to respective participants of the plurality of disparate chat rooms.

19. The method of claim 12, further including identifying, via the logic circuitry, the first participant, based on an email domain of the first participant, as being associated with a network address of at least one of a plurality of entities that is linked to one or more of the plurality of disparate chat rooms.

20. A method to be carried out by a data-communications system, including at least one server cooperatively acting with logic circuitry, that communicates chat messages among a plurality of disparate chat rooms having respective communications protocols and provides data-communications services including at least one communication bridging service for communications sessions involving a plurality of endpoint devices, the method comprising:
   forming a communication bridge between a first disparate chat room and additional disparate chat rooms for transmitting chat messages involving the first chat room;
   redirecting, in response to a communication from a first participant of the first chat room, the first participant for use of the at least one communication bridging service; and
   generating, for transmission of one or more chat messages between the first participant of the first chat room and participants of the respective additional disparate chat rooms via the respective communication protocols, a uniform resource locator (URL) for the communication bridge to carry the one or more chat messages for the first participant and participants of respective second and third chat rooms.

\* \* \* \* \*